(12) United States Patent
Park et al.

(10) Patent No.: US 11,829,408 B2
(45) Date of Patent: Nov. 28, 2023

(54) METHOD AND ELECTRONIC DEVICE FOR PROVIDING PERSONALIZED MEDIA CONTENT

(71) Applicant: Samsung Electronics Co., Ltd., Gyeonggi-do (KR)

(72) Inventors: Sungdeuk Park, Gyeonggi-do (KR); Hyunwoo Kim, Gyeonggi-do (KR); Jinho Mun, Gyeonggi-do (KR); Mihwa Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/736,660

(22) Filed: May 4, 2022

(65) Prior Publication Data
US 2022/0261435 A1 Aug. 18, 2022

Related U.S. Application Data

(63) Continuation-in-part of application No. PCT/KR2022/001248, filed on Jan. 24, 2020.

(30) Foreign Application Priority Data

Jan. 22, 2021 (KR) .......................... 10-2021-0009480

(51) Int. Cl.
*G06F 16/30* (2019.01)
*G06F 16/583* (2019.01)
(Continued)

(52) U.S. Cl.
CPC ............ *G06F 16/583* (2019.01); *G06F 16/55* (2019.01); *G06F 16/75* (2019.01); *G06F 16/783* (2019.01)

(58) Field of Classification Search
CPC ...... G06F 16/583; G06F 16/55; G06F 16/783; G06F 16/75
See application file for complete search history.

(56) References Cited

U.S. PATENT DOCUMENTS 9,619,891 B2 4/2017 Bose et al.
9,635,337 B1 * 4/2017 Dantzler ............... G06F 16/735
(Continued)

FOREIGN PATENT DOCUMENTS

KR 10-0526778 11/2005
KR 10-0738069 7/2007
(Continued)

OTHER PUBLICATIONS

International Search Report dated May 9, 2022 issued in counterpart application No. PCT/KR2022/001248, 11 pages.

*Primary Examiner* — Mahesh H Dwivedi
(74) *Attorney, Agent, or Firm* — The Farrell Law Firm, P.C.

(57) ABSTRACT

Disclosed is electronic device for providing personalized media content, including a memory configured to store a plurality of media contents, and a processor configured to, when at least some media contents of the plurality of media contents stored in the memory are selected, analyze an object contained in the selected at least some media contents, classify the selected at least some media contents into a plurality of groups, based on the analyzed object, extract at least some of the plurality of groups, based on a user profile, and create new media content from the media contents included in the extracted groups by using a predetermined condition.

16 Claims, 10 Drawing Sheets

(51) Int. Cl.
*G06F 16/55* (2019.01)
*G06F 16/783* (2019.01)
*G06F 16/75* (2019.01)

(56) References Cited

U.S. PATENT DOCUMENTS

| | | | |
|---|---|---|---|
| 9,917,870 B2 | 3/2018 | Barnett et al. | |
| 10,909,420 B2 | 2/2021 | Sandhan et al. | |
| 11,276,434 B1* | 3/2022 | Robert Jose | H04N 21/8405 |
| 2006/0074771 A1 | 4/2006 | Kim et al. | |
| 2012/0082401 A1* | 4/2012 | Berger | G06F 16/51 |
| | | | 382/306 |
| 2014/0250126 A1* | 9/2014 | Baldwin | G06F 16/51 |
| | | | 707/737 |
| 2014/0278969 A1* | 9/2014 | Newell | G06Q 30/0276 |
| | | | 705/14.53 |
| 2014/0280565 A1* | 9/2014 | Grewal | H04L 67/306 |
| | | | 709/204 |
| 2015/0172787 A1* | 6/2015 | Geramifard | H04N 21/252 |
| | | | 725/40 |
| 2016/0034459 A1* | 2/2016 | Larsen | G06F 16/487 |
| | | | 707/740 |
| 2016/0140124 A1* | 5/2016 | Aakolk | G06F 16/9035 |
| | | | 707/749 |
| 2017/0134776 A1* | 5/2017 | Ranjeet | G11B 27/031 |
| 2019/0027188 A1* | 1/2019 | Akolkar | G10L 25/57 |
| 2019/0200064 A1* | 6/2019 | Louis | G06F 40/289 |
| 2020/0162679 A1 | 5/2020 | Ahn et al. | |
| 2020/0320187 A1* | 10/2020 | Ide | G06F 21/45 |
| 2021/0073272 A1* | 3/2021 | Garrett | G06N 5/022 |
| 2021/0089825 A1* | 3/2021 | Shen | G06V 40/172 |
| 2021/0191578 A1* | 6/2021 | Miura | G06F 3/0481 |
| 2022/0286759 A1* | 9/2022 | Doig-Cardet | H04N 21/8549 |

FOREIGN PATENT DOCUMENTS

| | | | |
|---|---|---|---|
| KR | 1020120104648 | | 9/2012 |
| KR | 10-2014-0013878 | | 2/2014 |
| KR | 1020150094849 | | 8/2015 |
| KR | 1020170077000 | | 7/2017 |
| KR | 1020180013523 | | 2/2018 |
| KR | 1020200056593 | | 5/2020 |
| KR | 1020220015871 | | 2/2022 |
| KR | 10-2399210 | | 5/2022 |
| WO | WO-2017116015 A1 * | 7/2017 | G06F 17/30017 |

* cited by examiner

METHOD AND ELECTRONIC DEVICE FOR PROVIDING PERSONALIZED MEDIA CONTENT

CROSS REFERENCE TO RELATED APPLICATIONS

This application is a Bypass Continuation application of International Application No. PCT/KR2022/001248, which was filed on Jan. 24, 2022, and is based on and claims priority under 35 U.S.C. § 119 to Korean Patent Application No. 10-2021-0009480, which was filed in the Korean Intellectual Property Office on Jan. 22, 2021, the entire disclosure of each of which is incorporated herein by reference.

BACKGROUND

1. Field

The disclosure relates generally to an electronic device, and more particularly, to a method for providing personalized media content and an electronic device using the same.

2. Description of Related Art

A typical mobile device is highly portable, includes networking, sensing, and photographing functions, and has served as a catalyst to enable new services. In particular, a camera function is frequently used by users, causing mobile device makers to attempt to maximize camera performance along with memory capacity. In reality, high-quality photos/videos can be taken with the mobile device without the use of a large digital camera and has enabled users to quickly shoot photos and video and to store them in the user's device.

As the amount of media contents stored in an electronic device increases, the user may not remember what media contents are stored. As a result, the user may often fail to view or use the stored media contents. Even if the user tries to view a desired video or photo of the stored media contents, excess time is needed because the search is difficult. Also, the user may have to browse through all the contents to see one or two of the media contents.

In addition, when the user needs to edit media content to obtain desired media content, the user may first need to learn how to use an editing application.

As such, there is a need in the art for a more convenient manner of searching for and finding desired stored photos or video in an electronic device.

SUMMARY

The disclosure has been made to address at least the above-mentioned problems and/or disadvantages and to provide at least the advantages described below.

Accordingly, an aspect of the disclosure is to provide a method and apparatus in which media content is automatically classified and/or edited to suit a user's propensity/interest.

Another aspect of the disclosure is to provide a method and apparatus in which media content can be classified and/or edited to suit a user's propensity and/or interests, to enable more efficient management of the media contents.

Another aspect of the disclosure is to provide a method and apparatus in which a user can easily manipulate media contents that are not of interest to the user, so that the memory of the electronic device can be more efficiently managed. In accordance with an aspect of the disclosure, an electronic device for providing personalized media content may include a memory configured to store a plurality of media contents, and a processor configured to, when at least some media contents of the plurality of media contents stored in the memory are selected, analyze an object contained in the selected at least some media contents, classify the selected at least some media contents into a plurality of groups, based on the analyzed object, extract at least some of the plurality of groups, based on a user profile, and create new media content from the media contents included in the extracted groups by using a predetermined condition.

In accordance with an aspect of the disclosure, a method for providing personalized media content by an electronic device may include, when at least some media contents of a plurality of media contents stored in a memory are selected, analyzing an object contained in the selected at least some media contents, classifying the selected at least some media contents into a plurality of groups, based on the analyzed object, extracting at least some of the plurality of groups, based on a user profile, and creating new media content from the media contents included in the extracted groups by using a predetermined condition.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
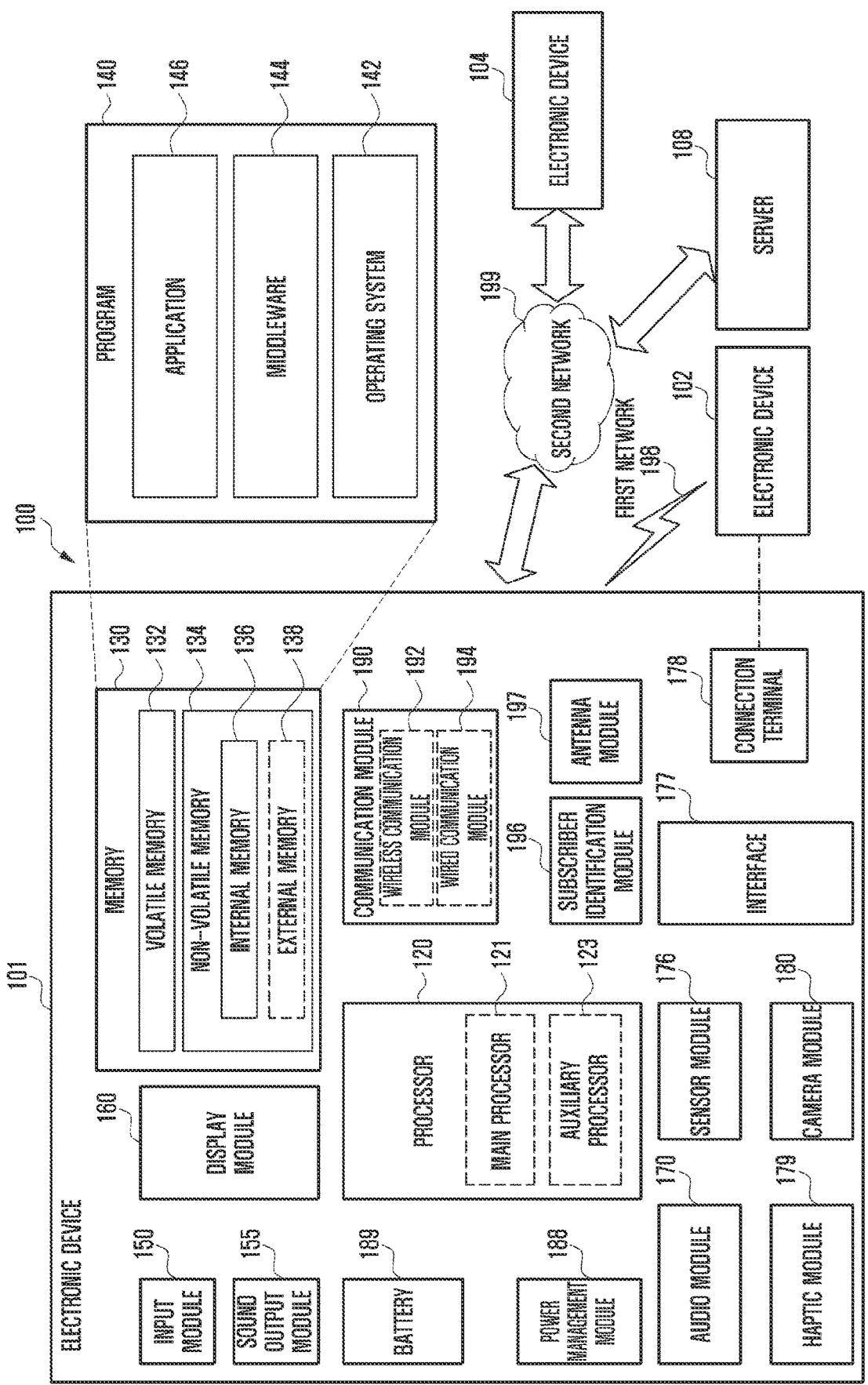
FIG. 1 illustrates an electronic device in a network environment according to an embodiment.

Hereinafter, various embodiments of this document will be described with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

FIG. 1 illustrates an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
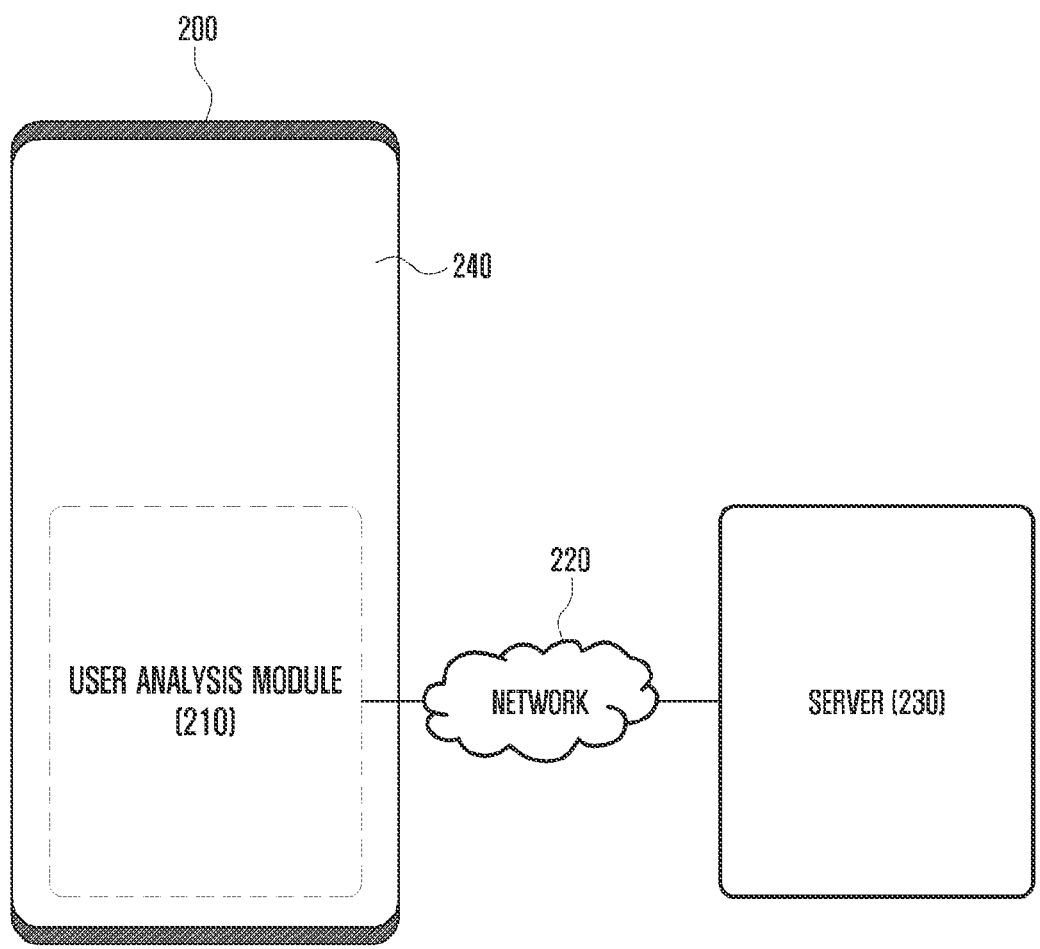
FIG. 2 illustrates a system according to an embodiment.

FIG. 2 illustrates a system according to an embodiment.

The system may include an electronic device 200 and a server 230 which may be connected by a network 220.

The electronic device 200 may provide personalized media content that may be created based on a user profile. The electronic device 200 may receive the user profile from the server 230. Alternatively, the electronic device 200 may include a user analysis module 210, which is capable of producing the user profile. The electronic device 200 may display the created personalized media content through a display 240.

The server 230 may be connected to the electronic device 200 through the network 220. The server 230 may receive a usage log of the electronic device 200 from the electronic device 200. The server 230 may produce the user profile by analyzing the received usage log of the electronic device 200. When the electronic device 200 requests the user profile, the server 230 may transmit the produced user profile to the electronic device 200. Although FIG. 2 shows that one electronic device 200 is connected to the server 230 through the network 220, a plurality of electronic devices may be connected to the server 230.

Figure 3:
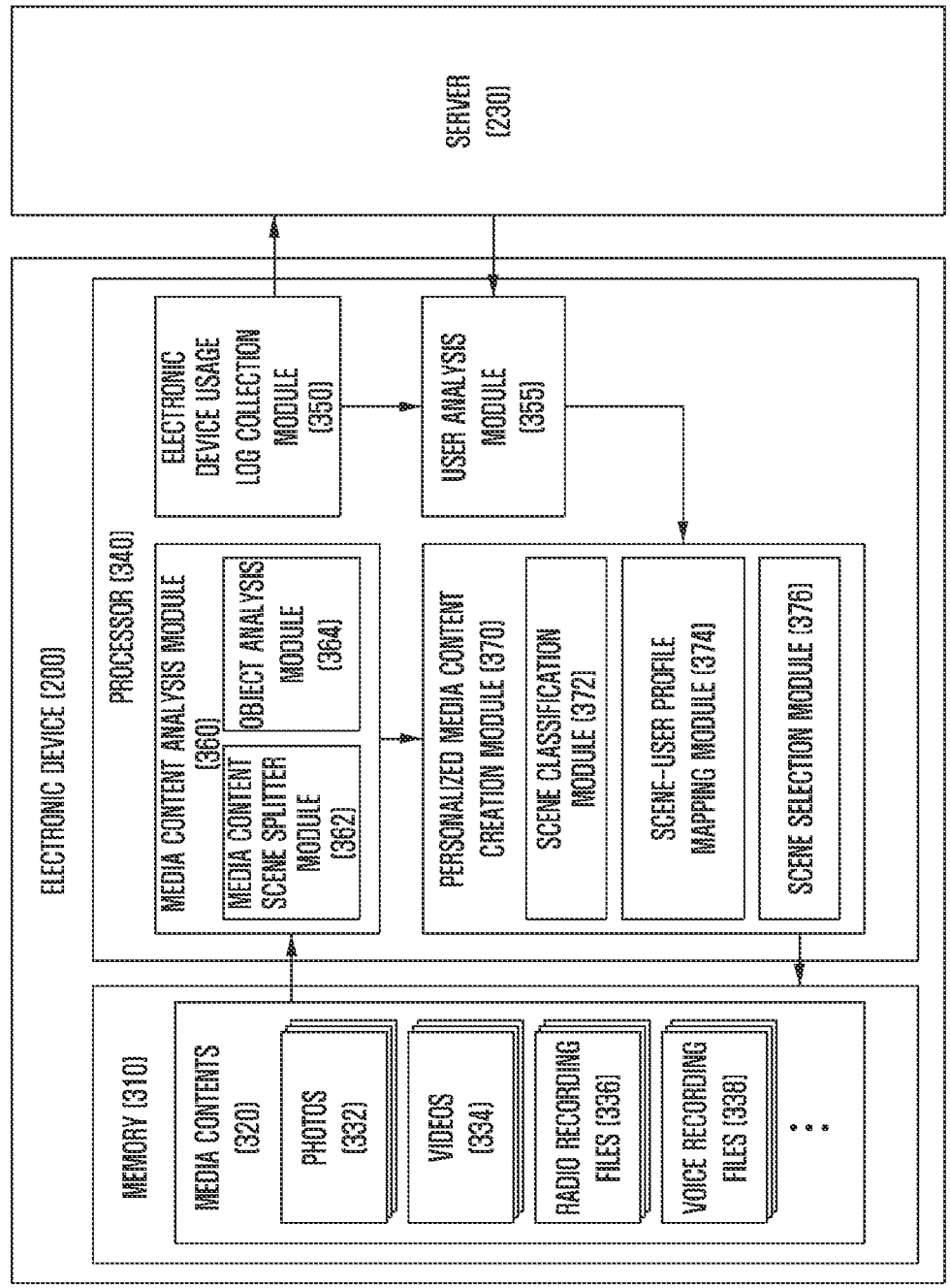
FIG. 3 illustrates an electronic device according to an embodiment.

FIG. 3 illustrates an electronic device according to an embodiment.

With reference to FIG. 3, the electronic device 200 may include a memory 310 and a processor 340.

The processor 340 may include an electronic device usage log collection module 350, a user analysis module 355, a media content analysis module 360, and a personalized media content creation module 370.

Various types of media contents 320 may be stored in the memory 310. For example, at least one type of photos 332, videos 334, radio recording files 336, and voice recording files 338 may be stored in the memory 310. In order to create personalized media content, the user may select at least one of the media contents stored in the memory 310. Alternatively, at least one of the media contents stored in the memory 310 may be selected by setting (e.g., period, location, type), or at least one media content included in an external memory may be used to create personalized media content.

The electronic device usage log collection module 350 may collect usage logs generated while the user uses the electronic device 200. For example, when the user executes an application (app) 146 while using the electronic device 200, a usage log of executing the app may be generated, and the generated usage log may be collected by the electronic device usage log collection module 350. In another example, when the user accesses a website while using the electronic device 200, a usage log for the accessed website may be generated, and the generated usage log may be collected by the electronic device usage log collection module 350. In addition, video recording, photo taking, app installation, or electronic device usage patterns may be collected as usage logs.

The electronic device usage log collection module 350 may transmit the collected usage logs to the user analysis module 355 and/or the server 230. The electronic device usage log collection module 350 may transmit the collected usage logs periodically or upon request. When the electronic device 200 is used by a plurality of users, the electronic device usage log collection module 350 may collect the usage logs for each user or each account.

The user analysis module 355 may produce a user profile by analyzing a user's propensity/interest based on the collected usage logs. The user analysis module 355 may perform the operation alone or in cooperation with the server 230 connected through the network 220. The user analysis module 355 may transmit the produced user profile to the personalized media content creation module 370.

The media content analysis module 360 may include a media content scene splitter module 362 and an object analysis module 364. The media content analysis module 360 may split scenes contained in the selected at least one media content and analyze an object.

The media content scene splitter module 362 may analyze one media content and thereby determine whether a plurality of scenes (e.g., sea, mountain, beach, etc.) is contained in one media content. When scenes are changed in one media content, the media content scene splitter module 362 may consider a scene before the change and a scene after the change as different scenes. Upon determining that one media content contains a plurality of scenes, the media content scene splitter module 362 may separate the one media content into the scenes. For example, if the media content is a video and contained scenes in the video change over time, the media content scene splitter module 362 may divide the video according to the scenes and separate different scenes. Each scene may be composed of one frame or a plurality of frames.

The media content scene splitter module 362 may analyze a plurality of media contents and thereby determine whether a plurality of scenes is contained in the plurality of media contents. For example, when a plurality of photos is selected, the media content scene splitter module 362 may analyze the plurality of photos and separate them according to scenes. One photo may be separated as one scene, and a plurality of photos may be separated as one scene. Also, one edited photo may be separated into a plurality of scenes. When media contents are photos, the photos may be separated in a name or shooting time order.

The media content scene splitter module 362 may determine whether a plurality of selected media contents contains a plurality of scenes, and if the plurality of scenes is contained, may separate the selected media contents into respective scenes.

The object analysis module 364 may analyze at least one object contained in media content separated according to scene. For example, if the media content is a photo composed of one scene, the object analysis module 364 may analyze at least one object (e.g., friend, sun, cloud, boat, etc.) contained in the photo. When media content is split into a plurality of scenes by the media content scene splitter module 362, the object analysis module 364 may analyze at least one object contained in each scene.

The object analysis module 364 may generate information about the analyzed object as a tag and may generate an accuracy score for each generated tag.

The personalized media content creation module 370 may create personalized media content by using the received user profile and the media content having the tag. The personalized media content creation module 370 may include a scene classification module 372, a scene-user profile mapping module 374, and a scene selection module 376.

The scene classification module 372 may receive media content including information about an object from the object analysis module 364 of the media content analysis module 360. The information about the object may be represented as a tag, and an accuracy score may be included with the tag. The scene classification module 372 may group (or cluster) scenes, based on information about objects contained in all scenes. For example, the scene classification module 372 may list the information about objects contained in all scenes and group all scenes in which the object information is a sea, and also group all scenes in which the object information is a friend. The scene classification module 372 may transmit the group and information about the grouped scenes to the scene-user profile mapping module 374.

The scene-user profile mapping module 374 may extract a group associated with the user profile from among the groups received from the scene classification module 372 by using a correlation score. The correlation score may increase as each scene contains more objects related to information included in the user profile. The user profile may be received from the user analysis module 355 or the server 230.

The scene selection module 376 may select a scene, based on the object information and the respective scenes selected by the scene-user profile mapping module 374, and create new media content by using the selected scene. In order to create new media content, the scene selection module 376 may select a scene having the correlation score (e.g., the accuracy score) higher than a reference threshold value. In order to create new media content, the scene selection module 376 may select a predetermined number of scenes in the order of a high correlation score (e.g., accuracy score). The scene selection module 376 may correct the created media content by using a pre-selected option value. For example, the scene selection module 376 may correct the number of scenes depending on the type (e.g., photo, video, etc.) of created media content and arrange the scenes in a shooting time and/or shooting location order.

The created media content may be stored in the memory 310 and displayed on the display 240 at a user's request.

Figure 4:
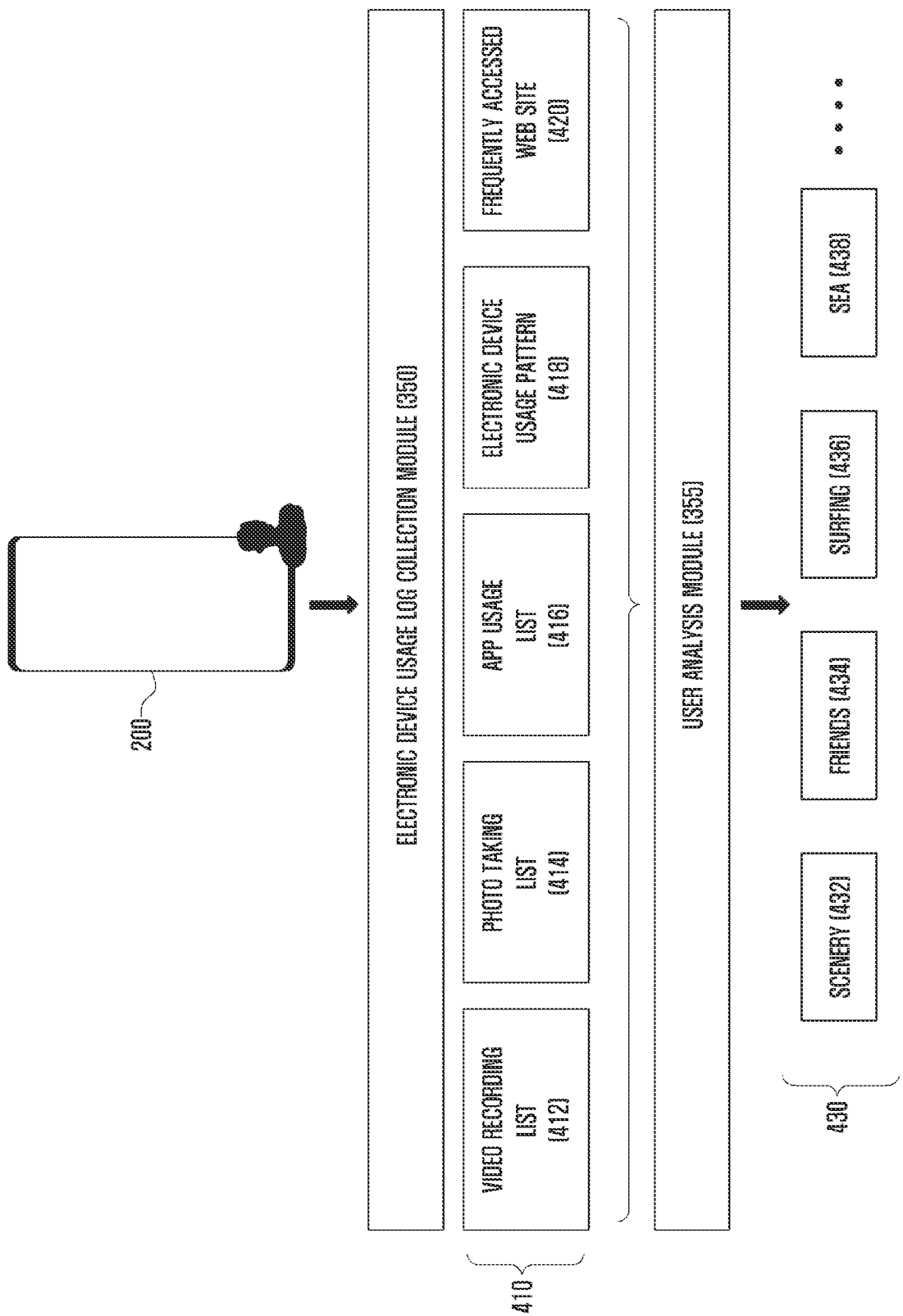
FIG. 4 illustrates operations performed by an electronic device usage log collection module and a user analysis module according to an embodiment.

FIG. 4 illustrates operations performed by an electronic device usage log collection module and a user analysis module according to an embodiment.

With reference to FIG. 4, when the user uses the electronic device 200, the electronic device usage log collection module 350 may collect usage logs 410 such as a video recording list 412, a photo taking list 414, an app usage list 416, an electronic device usage pattern 418, and/or a frequently accessed web site 420.

When one electronic device is used by a plurality of users, the electronic device usage log collection module 350 may collect the usage logs 410 for each user or each account.

The electronic device 200 may store the usage logs 410 collected by the electronic device usage log collection module 350 in the memory 310.

The electronic device usage log collection module 350 may transmit the collected usage logs 410 to the user analysis module 355 periodically or at the request of the user analysis module 355. The user analysis module 355 may produce a user profile 430 by analyzing a user's propensity/interest from the usage logs 410. For example, when the user frequently accesses web sites related to surfing or sea, the user analysis module 355 may add surfing 436 or sea 438 in the user profile 430. In another example, when the user takes a photo of scenery or friends, the user analysis module 355 may add scenery 432 or friends 434 in the user profile 430.

The user analysis module 355 may produce the user profile 430 by analyzing the user logs 410 alone or in cooperation with the server 230 through the network. For example, the user analysis module 355 may supplement the user profile 430 by reflecting a user profile transmitted by the server 230.

Figure 5:
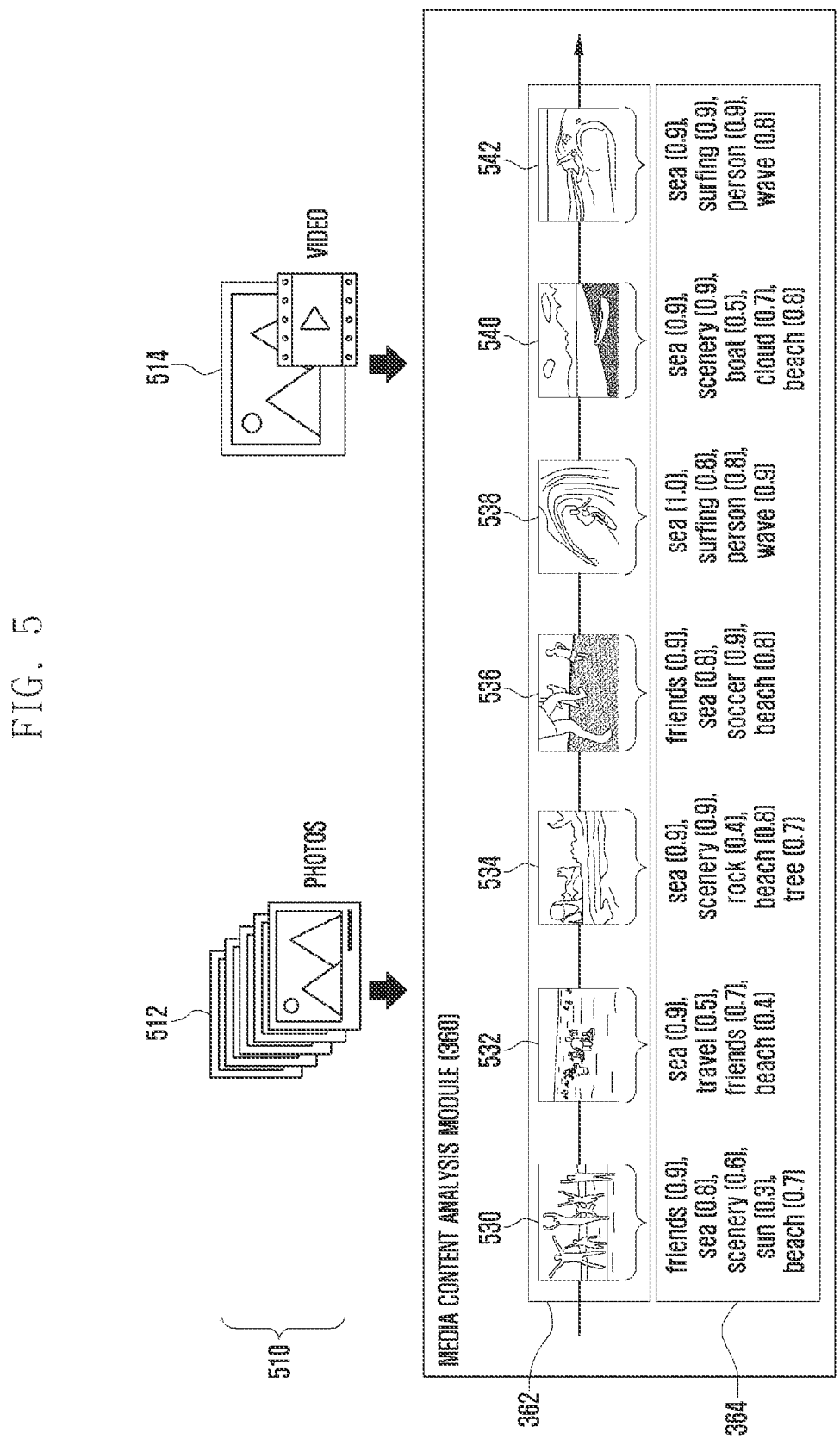
FIG. 5 illustrates operations performed by a media content analysis module according to an embodiment.

FIG. 5 illustrates operations performed by a media content analysis module according to an embodiment.

With reference to FIG. 5, a plurality of photos 512 and a video 514 may be selected, and the media content analysis module 360 may receive them. For example, the user may select the plurality of photos 512 and the video 514 stored in the memory 310 to create personalized media content.

The media content scene splitter module 362 included in the media content analysis module 360 may determine one photo as one scene. If one photo contains a plurality of scenes by editing, the media content scene splitter module 362 may separate the one photo into the plurality of scenes. The media content scene splitter module 362 may separate continuously taken pictures as one scene.

The media content scene splitter module 362 may separate one video into one or more scenes. With reference to FIG. 5, the one video 514 may contain at least seven scenes 530, 532, 534, 536, 538, 540, and 542. In this case, the media content scene splitter module 362 may divide the one video 514 into the at least seven scenes 530, 532, 534, 536, 538, 540, and 542.

When the media content scene splitter module 362 separates the media content based on the scene, the object analysis module 364 may analyze at least one object contained in each scene of the media content. With reference to FIG. 5, the object analysis module 364 may analyze and determine that the first scene 530 contains friends, sea, scenery, sun, and/or beach as at least one object. Also, the object analysis module 364 may analyze and determine that the fourth scene 536 contains friends, sea, soccer, or beach.

The object analysis module 364 may generate information about the analyzed object as a tag. An accuracy score may be included for each tag. For example, with reference to FIG. 5, the tags generated for objects in the first scene 530 may be friends, sea, scenery, sun, and/or beach, and the accuracy scores may be generated as 0.9 for friends, 0.8 for sea, 0.6 for scenery, 0.3 for sun, and/or 0.7 for beach.

Figure 6:
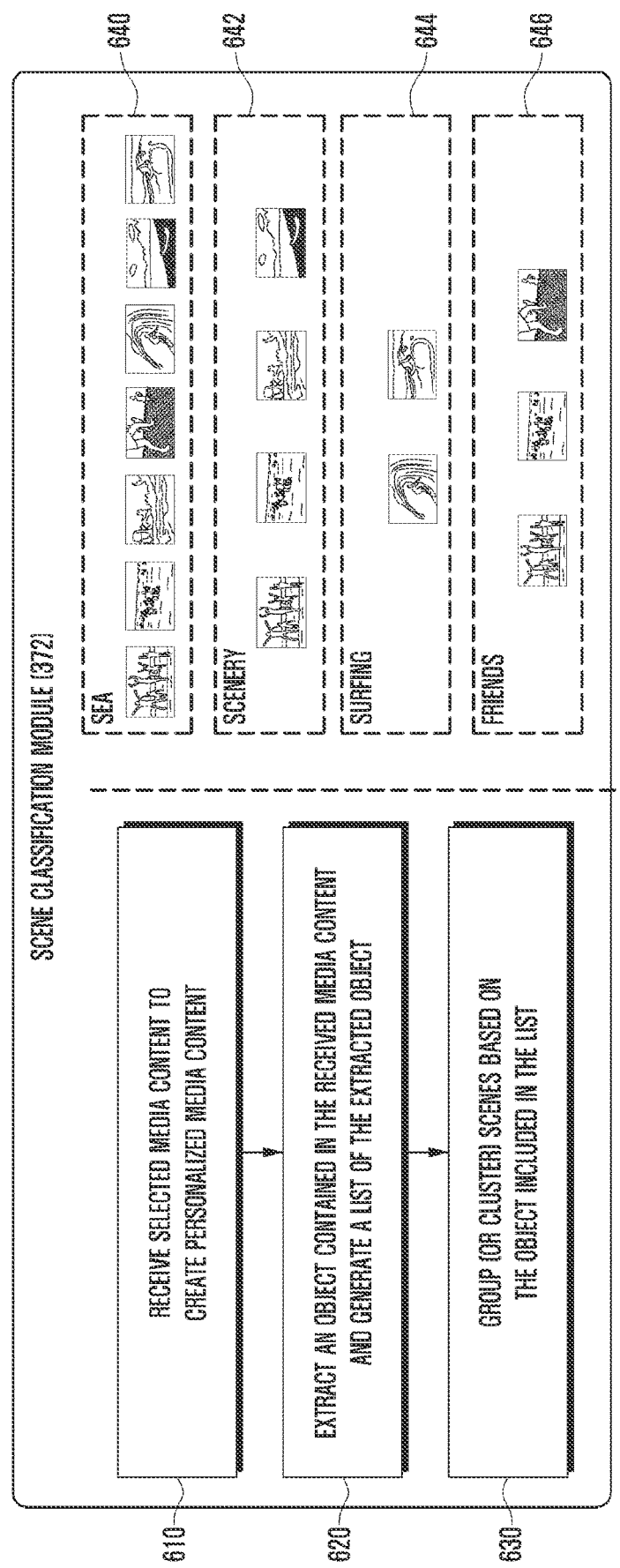
FIG. 6 illustrates operations performed by a scene classification module according to an embodiment.

FIG. 6 illustrates operations performed by a scene classification module according to an embodiment.

In step 610, the scene classification module 372 may receive the selected media content to create personalized media content. The scene classification module 372 may receive the media content from the media content analysis module 360. The scene classification module 372 may receive the media content including information about an object. The information about the object may be represented as a tag.

In step 620, the scene classification module 372 may extract at least one object contained in the received media content and generate a list of the extracted at least one object. The scene classification module 372 may extract at least one object from the received information about at least one object and generate a list of the extracted at least one object. Duplicate objects may be included only once in the list.

In step 630, the scene classification module 372 may group (or cluster) scenes, based on the objects included in the list.

With reference to FIG. 6, the scene classification module 372 may extract sea, scenery, surfing, and friends as at least one object from the received media content, and generate a list of the extracted at least one object. The scene classification module 372 may group scenes, based on the at least one object. The scene classification module 372 may group scenes including sea as an object into a first group 640, and group scenes including scenery as an object into a second group 642. The scene classification module 372 may group scenes including surfing as an object into a third group 644, and group scenes including friends as an object into a fourth group 646. Because one scene may contain a plurality of objects, one scene may belong to a plurality of groups. For example, at least three scenes 530, 532, and 536 in which a friend swims in the sea may be included in the first group 640 and the fourth group 646.

The scene classification module 372 may transmit the grouped scenes and the information about the group to the scene-user profile mapping module 374.

Figure 7:
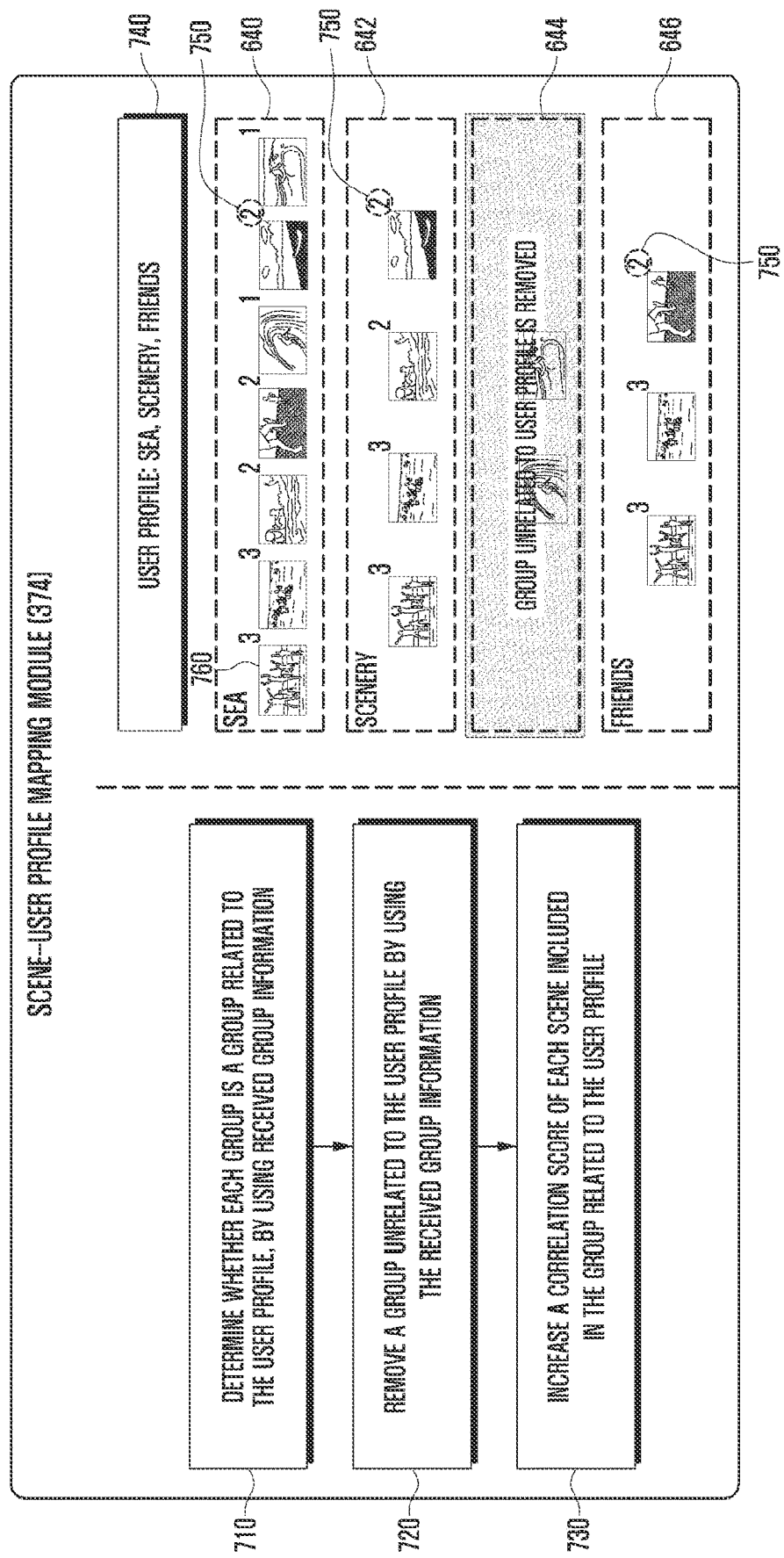
FIG. 7 illustrates operations performed by a scene-user profile mapping module according to an embodiment.

FIG. 7 illustrates operations performed by a scene-user profile mapping module according to an embodiment.

In step 710, the scene-user profile mapping module 374 may determine whether each group is related to the user profile, by using the group information received from the scene classification module 372.

In step 720, the scene-user profile mapping module 374 may remove a group unrelated to the user profile by using the received group information. Alternatively, the scene-user profile mapping module 374 may extract a group related to the user profile by using the received group information. The group unremoved at step 720 may be a group related to the user profile.

In step 730, the scene-user profile mapping module 374 may increase a correlation score 750 of each scene included in the group related to the user profile. For example, if one scene belongs to a plurality of groups and each of the plurality of groups is related to the user profile, the correlation score of the scene may be increased in proportion to the number of groups including the scene. The scene-user profile mapping module 374 may transmit information about the extracted group (e.g., scene information, correlation score) to the scene selection module 376.

With reference to FIG. 7, the user profile 740 may include sea, scenery, and friends, and the scene-user profile mapping module 374 may extract the first group 640, the second group 642, and the fourth group 646 as being related to the user profile 740, and remove the third group 644 as being unrelated to the user profile 740. The scene-user profile mapping module 374 may increase the correlation score 750 of scenes included in each group extracted as being related to the user profile 740. For example, the first scene 760 included in the first group 640 is also included in the second and fourth groups 642 and 646, so the correlation score may be 3.

Figure 8:
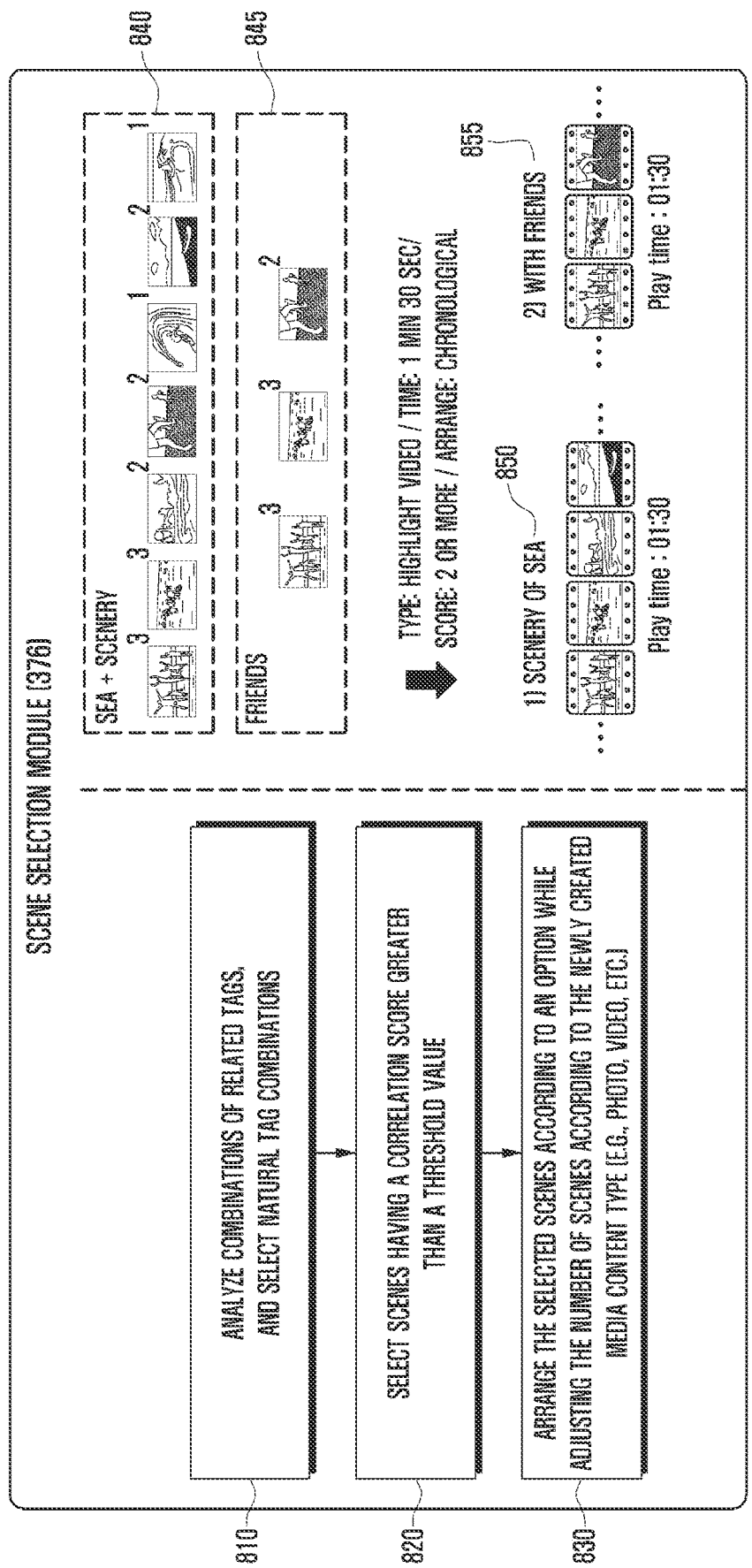
FIG. 8 illustrates operations performed by a scene selection module according to an embodiment.

FIG. 8 illustrates operations performed by a scene selection module according to an embodiment.

In step 810, the scene selection module 376 may analyze combinations of related tags, and select natural tag combinations. A combination of connectable information may be previously stored in the memory 310. For example, the scene selection module 376 may compare the information about objects of scenes with the previously stored combination of connectable information and thereby determine whether a combination is connectable.

In step 820, the scene selection module 376 may determine whether the correlation score of each scene is greater than a threshold value, and select scenes having the correlation score greater than the threshold value.

In step 830, the scene selection module 376 may arrange the scenes selected in step 820 according to an option while adjusting the number of scenes according to the type (e.g., photo or video) of media content to be newly created. The type of media content to be newly created may be selected by the user. The option may be time and/or location.

With reference to FIG. 8, the scene selection module 376 may determine whether information about objects of scenes is a connectable combination. The scene selection module 376 may determine that a combination 840 of sea and scenery is connectable, and determine that a friend 845 is not a connectable combination. The scene selection module 376 may create a video 850 by using scenes included in groups corresponding to sea and scenery, and create a separate video 855 by using scenes included in a group corresponding to the friends. The user may select information (e.g., media content type, time, number of scenes, and arrangement type) about media content to be created, or the scene selection module 376 may select media content to be created, based on the selected scenes. In FIG. 8, the information about media content to be created may be a highlight video, a time of 1 minute and 30 seconds, scenes with a correlation score of 2 or more, and an arrangement in a chronological order.

Figure 9:
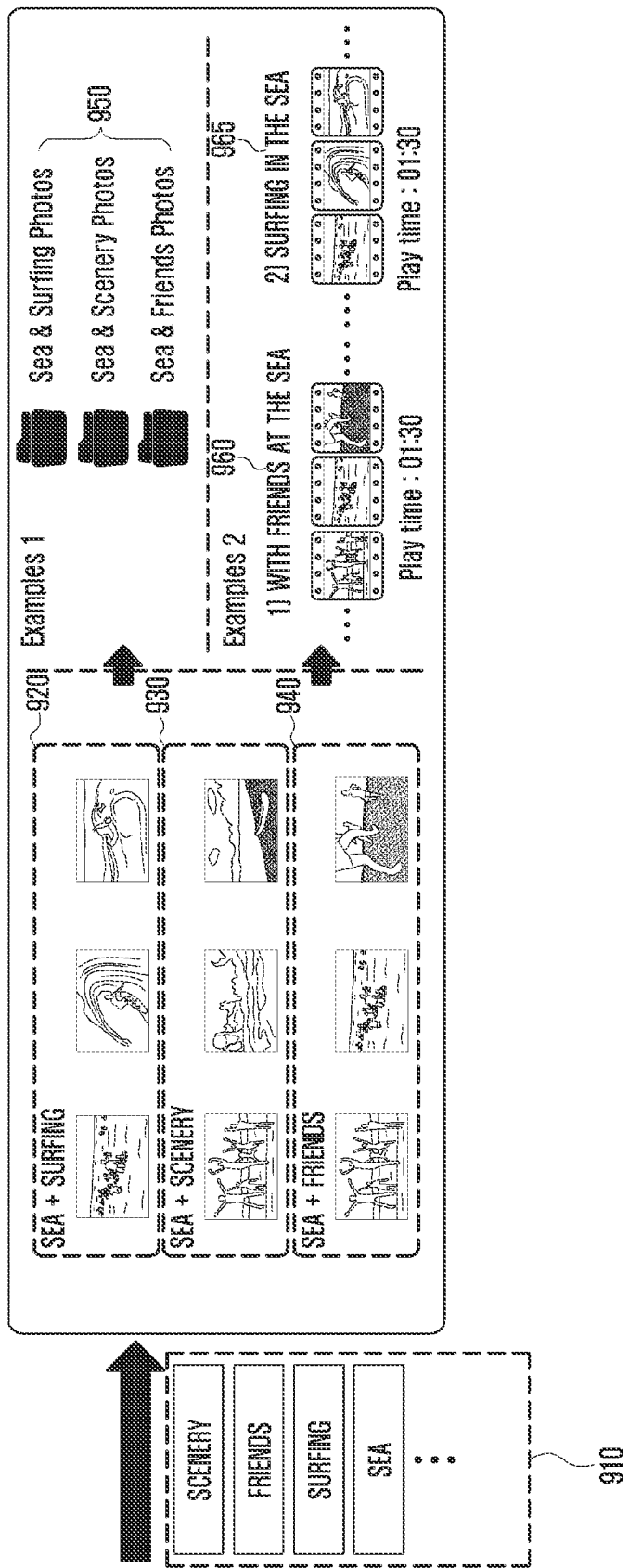
FIG. 9 illustrates a method of creating personalized media content according to an embodiment.

FIG. 9 illustrates a method of creating personalized media content according to an embodiment.

With reference to FIG. 9, the user profile 910 may include scenery, friends, surfing, and sea. The user profile 910 may be produced by the electronic device 200 or received from the server 230.

When a plurality of media contents is selected from the memory, the electronic device 200 may separate and classify each media content according to scenes and generate a connectable combination by using information about the scenes. FIG. 9 shows an example in which sea and surfing 920, sea and scenery 930, and sea and friends 940 are generated as connectable combinations.

The electronic device 200 may create new media content by using scenes included in each combination. For example, the electronic device 200 may create photos as new media content. The electronic device 200 may create respective folders 950 to store the scenes included in each group. The electronic device 200 may also create videos 960 and 965 as new media content. The electronic device 200 may create a video 960 by using the scenes included in the combination of sea and friends 940 and create a video 965 by using the scenes included in the combination of sea and surfing 920.

Figure 10:
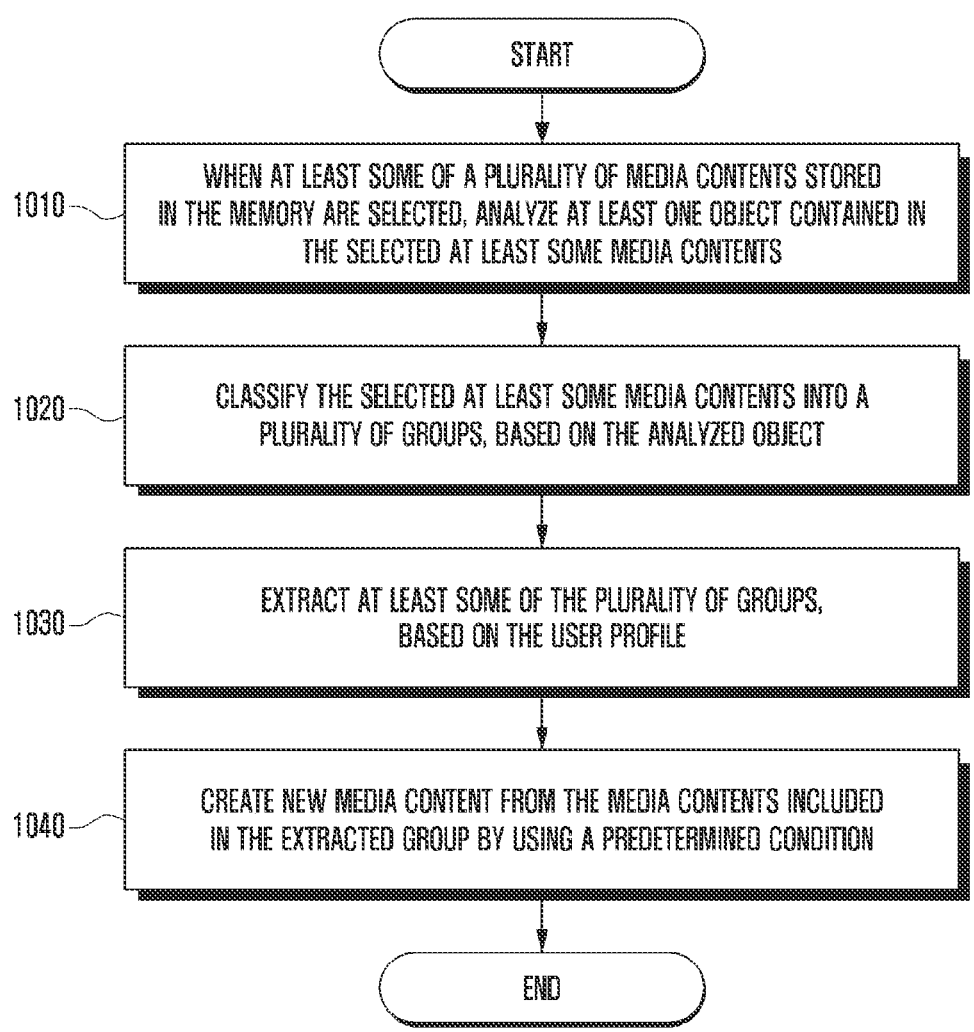
FIG. 10 illustrates operations of creating personalized media content by an electronic device according to an embodiment.

FIG. 10 illustrates operations of creating personalized media content by an electronic device according to an embodiment.

The steps illustrated in FIG. 10 may be implemented with instructions that can be loaded from the memory 310 of the electronic device and performed by the processor 340.

In step 1010, when at least some of a plurality of media contents stored in the memory are selected, the electronic device 200 may analyze at least one object contained in the selected at least some media contents. The at least some of the plurality of media contents stored in the memory may be selected by the user. When a plurality of scenes are included in the selected at least some media contents, the electronic device 200 may separate the media contents according to the scenes and analyze at least one object contained in each media content.

In step 1020, the electronic device 200 may classify the selected at least some media contents into a plurality of groups, based on the analyzed object. The electronic device 200 may classify the scenes as belonging to groups. One scene may belong to a plurality of groups.

In step 1030, the electronic device 200 may extract at least some of the plurality of groups, based on the user profile. The electronic device 200 may extract only the group related to the user profile from among the plurality of groups.

In step 1040, the electronic device 200 may create new media content from the media contents included in the extracted groups by using a predetermined condition. The new media content may be personalized media content highly related to the user profile. The predetermined condition may be for media content to be newly created based on the analyzed object. For example, the predetermined condition may be the type of media content to be newly created, a runtime of the content, the number of scenes to be included, or an arrangement type.

The electronic device 200 may further include the display on which the created media content is displayed.

According to an embodiment, an electronic device for providing personalized media content may include a memory storing a plurality of media contents, and a processor configured to, when at least some of the plurality of media contents stored in the memory are selected, analyze an object contained in the selected at least some media contents, to classify the selected at least some media contents into a plurality of groups, based on the analyzed object, to extract at least some of the plurality of groups, based on a user profile, and to create new media content from the media contents included in the extracted groups by using a predetermined condition.

The at least some media contents may be selected by a user.

The user profile may be produced by collecting and analyzing logs whenever a user of the electronic device uses the electronic device.

The logs may be records on at least one of an application used, a website accessed, a music played, a time used, and a place visited by the user of the electronic device.

The electronic device may further include a communication module, and the user profile may be received from a server through the communication module.

The processor may be configured to separate the selected at least some media contents according to a predetermined criterion, to analyze the object contained in each of the separated media contents, and to classify the separated media contents into the plurality of groups.

The processor may be configured to evaluate an accuracy of the analyzed object, and to classify the selected at least some media contents into the plurality of groups by further considering the evaluated accuracy of the object.

The processor may be configured to extract at least some of the plurality of groups by comparing the user profile with objects of media contents included in the plurality of groups.

The predetermined condition may be a condition determined for the new media content based on the analyzed object.

The electronic device may further include a display, and the processor 340 may be configured to display the created new media content on the display.

According to an embodiment, a method for providing personalized media content by an electronic device may include, when at least some of a plurality of media contents stored in a memory are selected, analyzing an object contained in the selected at least some media contents, classifying the selected at least some media contents into a plurality of groups, based on the analyzed object, extracting at least some of the plurality of groups, based on a user profile, and creating new media content from the media contents included in the extracted groups by using a predetermined condition.

The at least some media contents may be selected by a user.

The user profile may be produced by collecting and analyzing logs whenever a user of the electronic device uses the electronic device.

The logs may be records on at least one of an application used, a website accessed, a music played, a time used, and a place visited by the user of the electronic device.

The method herein may further include receiving the user profile from an external server. Analyzing an object may include separating the selected at least some media contents according to a predetermined criterion, and analyzing the object contained in each of the separated media contents, and classifying into a plurality of groups may include classifying the separated media contents into the plurality of groups, based on the analyzed object.

The method may further include evaluating an accuracy of the analyzed object, and the classifying into a plurality of groups may include classifying the selected at least some media contents into the plurality of groups by further considering the evaluated accuracy of the object.

Extracting at least some of the plurality of groups be performed by comparing the user profile with objects of media contents included in the plurality of groups.

The predetermined condition may be determined for the new media content based on the analyzed object.

The method according to various embodiments of the disclosure may further include displaying the created new media content on a display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device for providing personalized media content, the electronic device comprising:
a memory configured to store a plurality of media contents; and
a processor configured to:
when at least some media contents of the plurality of media contents stored in the memory are selected, analyze an object contained in the selected at least some media contents,
classify the selected at least some media contents into a plurality of groups, based on the analyzed object,
separate the selected at least some media contents into at least one scene according to a predetermined criterion,
extract at least some of the plurality of groups associated with a user profile by using a correlation score that increases as each at least one scene includes more objects related to information in the user profile,
create new media content from the media contents included in the extracted groups by selecting a scene of the at least one scene having the correlation score higher than a threshold value,
select at least one group of the plurality of groups corresponding to the user profile, and
further create the new media content based on the at least one scene of the selected at least one group.

2. The electronic device of claim 1,
wherein the at least some media contents are selected by a user.

3. The electronic device of claim 1,
wherein the user profile is produced by collecting and analyzing logs in each instance when a user of the electronic device uses the electronic device.

4. The electronic device of claim 3,
wherein the logs are records on at least one of a used application, an accessed website, a played music file, a time spent to use the application, and a place visited by the user of the electronic device.

5. The electronic device of claim 1, further comprising:
a communication module, wherein the user profile is received from a server through the communication module.

6. The electronic device of claim 1, wherein the processor is further configured to:
analyze the object contained in each of the at least one scene, and
classify the at least one scene into the plurality of groups.

7. The electronic device of claim 1, wherein the processor is further configured to:
evaluate an accuracy of the analyzed object, and
classify the selected at least some media contents into the plurality of groups by further considering the evaluated accuracy of the object.

8. The electronic device of claim 1, further comprising:
a display,
wherein the processor is configured to display the created new media content on the display.

9. A method for providing personalized media content by an electronic device, the method comprising:
when at least some media contents of a plurality of media contents stored in a memory are selected, analyzing an object contained in the selected at least some media contents;
classify the selected at least some media contents into a plurality of groups, based on the analyzed object;
separating the selected at least some media contents into at least one scene according to a predetermined criterion;
extracting at least some of the plurality of groups associated with a user profile by using a correlation score that increases as each at least one scene includes more objects related to information in the user profile;
creating new media content from the media contents included in the extracted groups by selecting a scene of the at least one scene having the correlation score higher than a threshold value;
selecting at least one group of the plurality of groups corresponding to the user profile; and
further creating the new media content based on the at least one scene of the selected at least one group.

10. The method of claim 9,
wherein the at least some media contents are selected by a user.

11. The method of claim 9,
wherein the user profile is produced by collecting and analyzing logs in each instance when a user of the electronic device uses the electronic device.

12. The method of claim 11,
wherein the logs are records on at least one of a used application, an accessed website, a played music file, a time spent to use the application, and a place visited by the user of the electronic device.

13. The method of claim 9, further comprising:
receiving the user profile from an external server.

14. The method of claim 9, wherein analyzing the object includes:
analyzing the object contained in each of the at least one scene, and
classifying the at least one scene into the plurality of groups.

15. The method of claim 9, further comprising:
evaluating an accuracy of the analyzed object,
wherein the selected at least some media contents are classified into the plurality of groups by further considering the evaluated accuracy of the object.

16. The method of claim 9, further comprising:
displaying the created new media content on a display.

* * * * *